(12) United States Patent
Eddins

(10) Patent No.: US 11,889,798 B2
(45) Date of Patent: Feb. 6, 2024

(54) MODULAR PLANT LIGHTING AND PLANT SUPPORT SYSTEM

(71) Applicant: Scott Eddins, Southlake, TX (US)

(72) Inventor: Scott Eddins, Southlake, TX (US)

( * ) Notice: Subject to any disclaimer, the term of this patent is extended or adjusted under 35 U.S.C. 154(b) by 111 days.

(21) Appl. No.: 17/278,225

(22) PCT Filed: Sep. 22, 2019

(86) PCT No.: PCT/US2019/052521
§ 371 (c)(1),
(2) Date: Mar. 19, 2021

(87) PCT Pub. No.: WO2020/061594
PCT Pub. Date: Mar. 26, 2020

(65) Prior Publication Data
US 2021/0345553 A1 Nov. 11, 2021

Related U.S. Application Data

(60) Provisional application No. 62/734,963, filed on Sep. 21, 2018.

(51) Int. Cl.
*A01G 7/04* (2006.01)
*A01G 9/12* (2006.01)

(52) U.S. Cl.
CPC ............... *A01G 7/045* (2013.01); *A01G 9/12* (2013.01)

(58) Field of Classification Search
CPC .......... A01G 7/045; A01G 9/12; A01G 9/249; A01G 9/20; A01G 9/26; A01G 9/022; A01G 31/06; F21V 19/003; F21V 19/0015; F21V 23/001
See application file for complete search history.

(56) References Cited

U.S. PATENT DOCUMENTS

| | | | |
|---|---|---|---|
| 3,772,827 A * | 11/1973 | Ware | A01G 9/022 D6/558 |
| 6,183,104 B1 | 2/2001 | Ferrara | |
| 7,202,613 B2 | 4/2007 | Morgan | |
| 7,857,482 B2 | 12/2010 | Reo | |
| 9,033,542 B2 | 5/2015 | Peck | |
| 9,206,966 B2 | 12/2015 | Morgan et al. | |
| 9,337,598 B1 | 5/2016 | Baright | |
| 9,644,828 B1 | 5/2017 | May | |

(Continued)

FOREIGN PATENT DOCUMENTS

| CN | 2859190 Y | 9/2005 |
|---|---|---|
| CN | 201547581 U | 9/2009 |

(Continued)

OTHER PUBLICATIONS

European Search Report, Application No. 19861811.8, dated Jun. 1, 2022, 9 pages.

(Continued)

*Primary Examiner* — Trinh T Nguyen
(74) *Attorney, Agent, or Firm* — Peter V. Schroeder; Booth Albanesi Schroeder PLLC

(57) ABSTRACT

A modular grow lighting assembly provides a structure for integrating grow light strips into channels defined in vertical and horizontal structural supports. Levels of support structure can be added above previously installed levels as needed. A cable management system is also provided.

17 Claims, 4 Drawing Sheets

(56) References Cited

U.S. PATENT DOCUMENTS

| | | |
|---|---|---|
| 10,006,615 B2 | 6/2018 | Horst |
| 10,132,488 B1 | 11/2018 | Waldon |
| 10,941,927 B1 | 3/2021 | Yang |
| 2007/0171631 A1 | 7/2007 | Davis |
| 2009/0109708 A1 | 4/2009 | Horwitz |
| 2010/0107489 A1* | 5/2010 | Silver .................... A01G 9/249 47/58.1 R |
| 2010/0135020 A1 | 6/2010 | Moore |
| 2010/0148673 A1 | 6/2010 | Stewart |
| 2011/0089838 A1 | 4/2011 | Pickard |
| 2011/0192082 A1 | 8/2011 | Uchiyama |
| 2011/0248631 A1 | 10/2011 | Chuang |
| 2011/0267805 A1 | 11/2011 | Hua |
| 2012/0201022 A1 | 8/2012 | van de Ven et al. |
| 2013/0094225 A1 | 4/2013 | Leichner |
| 2014/0168969 A1 | 6/2014 | Heggemann et al. |
| 2017/0325415 A1* | 11/2017 | MacDonald ............. A01G 9/12 |
| 2017/0367273 A1 | 12/2017 | Bylsma |
| 2018/0014487 A1* | 1/2018 | Tinsley .................... A01G 9/12 |
| 2019/0183062 A1* | 6/2019 | Pham ..................... A01G 9/022 |
| 2019/0293269 A1 | 9/2019 | Roys |
| 2020/0375120 A1* | 12/2020 | Kaneko ................ A01G 27/003 |

FOREIGN PATENT DOCUMENTS

| | | |
|---|---|---|
| CN | 202056668 U | 3/2011 |
| CN | 201265761 Y | 5/2012 |
| CN | 202834814 U | 5/2012 |
| CN | 203363827 U | 3/2013 |
| CN | 205191407 | 4/2016 |
| CN | 106386457 A | 2/2017 |
| CN | 206929621 | 1/2018 |
| CN | 108758376 A | 11/2018 |
| CN | 110671645 A | 1/2020 |
| CN | 110701514 A | 1/2020 |
| EP | 3324099 A1 * | 5/2018 |
| KR | 20090004575 | 5/2009 |
| KR | 101243167 B1 | 3/2013 |
| KR | 101781823 B1 | 9/2017 |
| WO | 2010044662 A1 | 4/2010 |
| WO | 2021161403 A1 | 11/2012 |
| WO | 2020050846 A1 | 3/2020 |

OTHER PUBLICATIONS

Office Action, Canadian Patent Office, Application No. 3,113,434, dated Sep. 23, 2022, 3 pages.

PCT/US2019/052521, International Search Report and Written Opinion, dated Jan. 10, 2020, 9 pages.

* cited by examiner

US 11,889,798 B2

MODULAR PLANT LIGHTING AND PLANT SUPPORT SYSTEM

TECHNICAL FIELD

The disclosed apparatus and methods relate to agricultural grow lighting and more specifically to a modular, compact and efficient dual-purpose agricultural grow lighting and plant support, or scrog, system which allows the user to expand, adapt and re-use the system to meet the needs of the plants through the plant growth cycle.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF PREFERRED EMBODIMENTS

Figure 1:
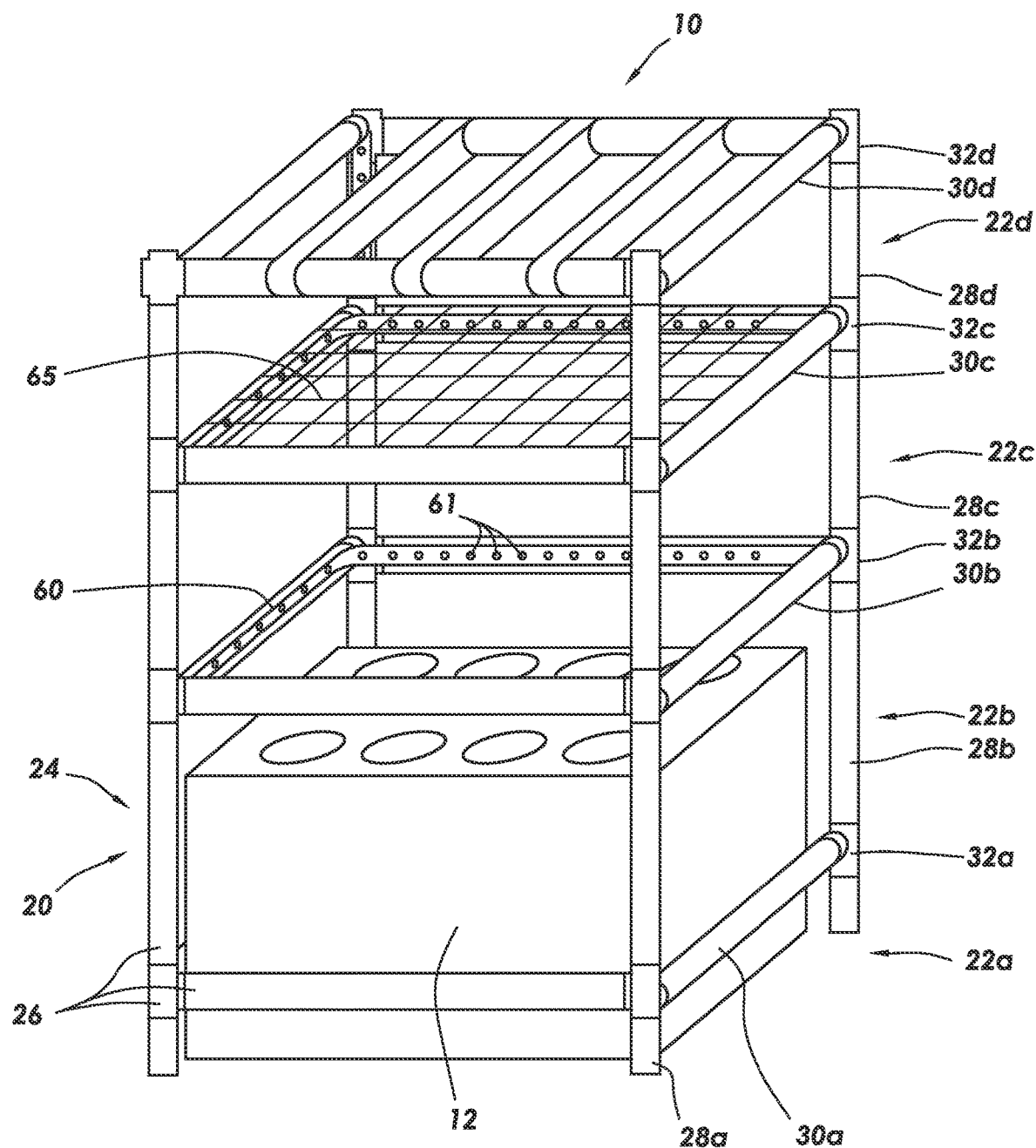
FIG. 1 is an orthogonal view of an exemplary grow lighting support and plant support assembly system according to aspects of the disclosure.

The present disclosures are described by reference to drawings showing one or more examples of how the disclosures can be made and used. In these drawings, reference characters are used throughout the several views to indicate like or corresponding parts. In the description which follows, like or corresponding parts are marked throughout the specification and drawings with the same reference numerals, respectively. The drawings are not to scale and proportions of certain parts have been exaggerated to better illustrate details and features. Directional terms, such as "up," "down," "upward," "downward," and the like, are made with reference to the accompanying figures unless otherwise indicated and are not to be taken as limiting the embodiments in their orientations of use.

Grow lighting is used to refer to lights, typically in a selected light spectrum (or color) and intensity, for growing plants in a controlled environment, such as at indoor agricultural facilities, laboratories and the like. The plants grown using such lighting vary in shape, size, pattern of growth, leaf size, etc., and present different challenges depending on the plant's physical characteristics. Further, the plant life-cycle and biology will play a role in grow light selection, for example, to produce the highest quality or quantity of desirable fruit, flower, or other usable plant product.

Grow lighting fixtures are expensive to install, require custom electrical work for overhead installation, are not easily adjustable in height for ideal distances from plants, do not provide light in between and around plants, and are expensive to repair and replace.

The current state of the art for growing plants in indoor controlled environments utilizes lighting fixtures and power elements mounted to a ceiling or to an alternate support structure above the plants. The overhead lighting must provide sufficient lighting for proper growth of the plants below. Growers also use various lighting fixtures emitting light at different spectrums and levels of output (intensity) during different cycles of plant growth. In many instances this requires the plants to be moved from room-to-room during the growth cycle to accommodate for the needs of the plant. LED lighting is quickly being proven as a preferred alternative to other lighting sources. With more efficient and powerful surface mount designs, LED lighting is becoming a viable option for grow lighting solutions where previously LED lights were ineffective due to a lack of effective ultra-violet (UV) lighting output.

Figure 2:
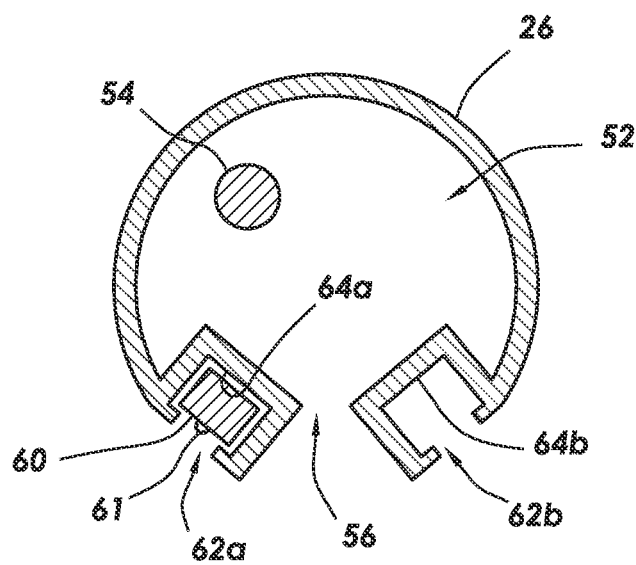
FIG. 2 is a cross-sectional view of an exemplary grow lighting structural support member according to aspects of the disclosure.

Growers also use "scrogs" which provide a physical support structure for plants as they grow taller and wider in order to "direct" the growth of the plant in order to most efficiently utilize the space available in the grow room. Exemplary scrog systems are seen in FIGS. 1-2. The use of scrogs improves flower yield, especially in circumstances where plants are in close proximity to each other.

The disclosure presents a customizable, modular, compact and efficient dual-purpose agricultural grow lighting and scrog system which allows the user to expand, adapt and re-use the system to meet the needs of the plants through the plant growth cycle. The disclosed apparatus can be used, for example, for indoor and outdoor agricultural growth for use with cannabis, produce, hemp and flowering plants, including hydroponic and soil based grows.

The disclosed grow lighting support assembly and scrog assembly 10 which is modular. The support assembly 20, acts as a grow lighting assembly 50, and can double as a "scrog" or plant growth support structure, as explained herein. The modular lighting assembly 50 allows the user to customize and easily adjust the lighting spectrum, intensity and proximity to the plants in order to adapt to changing lighting requirements during the plant's life cycle. The modular and customizable design allows for a lighting assembly where light sources are easily installed, removed, and replaced, and eliminates the need to replace fixtures at the time of lighting replacement. Electrical components and transformers can be located on ground level and can be customized to accommodate the location. Lighting placement is variable and customizable with the capability of being above the plants, pots, or ground at variable heights and in and around the foliage of the plants. The lighting channel and scrog structure also acts as a lighting and cable management system.

FIG. 1 is a diagram of the modular scrog and grow lighting system 10 and depicts use with a typical grow tank 12 where the plants (not shown) are positioned in the exemplary eight openings in the top wall 14 of the tank 12 for holding pots (not shown). The tank 12 can be for a single or multiple plants and can be separately supplied with water for the plants via a separate irrigation system, such as drip lines, sprayers, etc. Obviously the plants can be positioned on a floor, table, or other surface, rather than in a tank.

The grow lighting support assembly 20 is modular and includes a plurality of structural levels 22. Each structural level 22 is formed of a plurality of support members 26, including a plurality of vertical support members 28 and a plurality horizontal support members 30 connected to one another at joints, preferably with a plurality of suitable joint members 32. While the support members 26 can be of various materials, an efficient and flexible structural system can use generally tubular members with interlocking joints connecting adjacent support members.

The members can be non-metallic, such as plastic or rubber. The members can be extruded plastic for ease of manufacture and ease of creating customizable lengths. Extrudable plastics include polyethylene, polypropylene, acrylic, nylon (polyamides), polystyrene, and polyvinyl chloride (PVC), for example. The parts are preferably UV resistant given that they will be used in conjunction with UV lights. UV stabilizers can be added to extruded materials such that the product can withstand high UV exposure. The extrusions are easily cut to selected lengths, making them customizable to any particular scrog frame system.

The connectors or joints 32 of the support assembly preferably slide over the ends of the support members 26, as is known in the art, thereby connecting adjacent support members together. Preferably the joints provide a friction fit with the support members 26. The support members 26 can be sized (e.g., diameter) to connect with off-the-shelf connectors 32, thereby saving on design and manufacture of specialized joints. In some embodiments, the support members are waterproof and ideal for irrigated and humid environments. The structural members provide support for the electrical system as will be explained below, and are preferably of a design for integrated support of the electrical grow light assembly.

An exemplary level 22b is seen in FIG. 1. In the embodiment shown, of plurality of horizontal members 30b, in this case four such members, generally describes a rectangle. A plurality of vertical members 28b are provided, in this case four such members positioned at the corners defined by the rectangle. Connecting joints 32b are provided to connect adjacent support members 28b and 30b to one another, in this case at the corners of the rectangle. Together, the level 22b generally forms a rectangular column. Alternate shapes can be formed such as circular, parallelogram or irregular columns.

Multiple levels 22a-d can be used to create a support structure of desired height. Each level 22 connects to and is supported by the level below. In the embodiment shown, the connecting joints 32 of a lower level 22 connect to the vertical members 28 of a level above. In such an embodiment, the connecting joints 32 define four connections, two horizontally oriented for use with horizontal members 30 and two vertically oriented for use with vertical members 28. Other arrangements are possible. As the plants grow taller, additional levels 22 can be added to the assembly.

The bottom level 22a is supported by and contacts the floor or other surface. The bottom level vertical members 28a can be relatively short, effectively forming feet for contacting the floor. The vertical members 28a on the lowest level 22a are optional in some embodiments. Further, in some embodiments the bottom level assembly 22a can be supported by the tank 12, although this may limit the flexibility of use or stability of the system. In such an embodiment, the bottom level assembly members can be positioned on the upper surface of the tank, positioned in cooperating grooves or brackets on the tank, or can be secured to the tank via fasteners.

The lower two levels 22a-b can be identified as a base assembly 24 which forms a structural foundation for the upper module levels 22c and above. The base assembly 24 is positioned around the designated grow area or tank 12 and sits on the floor. In this embodiment, the base assembly 24 is made up of differing lengths of structural member 26 to create a structure to encircle or surround the plants. An exemplary base assembly 24 includes a plurality of vertical support members 28 and horizontal support members 30, connected to one another with suitable joint members 32. In an embodiment, the base assembly 24 includes optional shorter vertical members which can function as feet, supporting the remainder of the base assembly above the floor. In the embodiment shown, the base assembly generally forms a rectangular column, although other shapes can be used.

Additional modular levels 22 can be added as desired above the bottom level 22a. Each level 22 can include support and/or connecting structures allowing the addition of further levels above while providing sufficient stability for the structure. For example, along the top of a level, supporting structures are defined which cooperate with an additional level. In one embodiment, such supporting structures are the connecting members 32, which define connections for use with corresponding vertical members 28 of the next level above. Other arrangements can be used, such as providing supporting surfaces for the higher levels, grooves, detents or other cooperating surface with upper level members, use of mounting brackets and other fasteners, etc., to create stackable levels.

Each additional level 22 preferably comprises the same number of vertical members 28 as the level below. In an embodiment the vertical members of an upper level are collinear with and supported above the vertical members of the level below. For example, as shown, the vertical members 28b of level 22b are positioned aligned with (collinear with) and above the vertical members 22a of the bottom level 22a. The connectors 32b of the second level 22b thus interconnect corresponding vertical members 22a and 22b. The second level 22b further includes a plurality of horizontal members 30b which encircle the plants as they grow to sufficient height above the tank 12. In the embodiment shown, the horizontal members 30b are of the same number, length, and create the same shape (e.g., square) as the corresponding horizontal members 30a of the level 22a below.

Further levels 22c, etc., can be added as desired. For example, as the plants grow in height, additional modular levels 22 can be added to provide structural support and lighting for the growing plants. Only three levels are shown in FIG. 1, however additional levels can be used.

As an example, one embodiment can have members of the following lengths. The bottom level 22a has a plurality of vertical members 28a which are each approximately 6 inches in length. The horizontal members 30a are approximately 54 inches in length. The members are connected via a plurality of connectors 32a, as shown. The connectors 32a are approximately 2 inches in height and width, although this may vary depending on the configuration of the connector. The horizontal members 30a encircle the tank and its plants, creating a generally square column. These dimensions may be suitable, for example, for a four foot square tank, allowing some space between the tank walls and the support and lighting assembly. The upper levels 22b, etc., in an embodiment, use vertical members 28b, etc., of greater length, for example, eighteen inches. Other lengths of vertical member can be used. In one embodiment the vertical members are between eighteen and thirty inches long.

In some embodiments, the vertical supports 28 are adjustable in height. For example, the vertical members can be height adjustable, such as by having the vertical support member comprise a telescoping assembly with slidable tubulars nested in one another, with a locking mechanism, such as a clamp, for the user to select a height for their application. In another embodiment, multiple vertical members are available of varying height for selective use. For example, a kit of vertical members can be provided, with several sets (e.g., of four) of members of several heights, such as six, twelve and eighteen inches. Such sizes are exemplary. In another embodiment, the support members are selected to be of a material such that they are easily cut to length on-site. For example, the vertical and horizontal members can be cut on-site, allowing for custom applications. The members can be sized using hand-held tools such as a hand-saw, a pipe cutter, and the like. The horizontal members can similarly be adjustable in length or interchangeable with members of varying length.

The modular levels 22 can support growth support accessories 65, such as scrog netting, lines, ribbons, or other plant guides or supports. For example, as seen in FIG. 1, the level 22c supports a scrog netting 65 for guiding and supporting the plants as they grow. Growth support structures can be attached to the horizontal or vertical members by appropriate attachment mechanisms, such as by tying, bracket mounting, or other fastener.

As explained above, grow lighting is provided in linear lighting sources 60, such as lighting strips (e.g., LED lighting strips). Each linear lighting source contains a plurality of spaced apart lights 61, such as LED lights. The lighting sources can comprise a series of wires interconnected with spaced apart lights, lighting cards, or the like. Preferably the lighting sources are made of flexible tape or "rope" with embedded lights. Lighting can be used in various spectrums, intensities, energy levels, etc., as explained elsewhere herein. The lighting strips can have adhesive backing for mounting the strips to the structure. The light strips are removable and interchangeable as they need to be replaced, repaired, or swapped out for a different type of lighting. Further, waterproof or weatherproof light strips can be used, allowing for safe use of the system in irrigated or humid environments such as are present in most grow facilities.

The vertical and horizontal support members provide lighting system supports for mounting and orientating lighting sources, and provide for electrical cable management. The electrical system supports are preferably extruded, non-metallic units which do not act to dissipate heat given the low heat output of the lighting sources. Any of the vertical and horizontal supports can be replaced with or comprise electrical system supports. Obviously there may be little need for lighting at the lowest levels, below the plants, however, lighting supports could be employed to provide channels for management of electrical cables.

FIG. 2 is a cross-sectional view of an exemplary grow lighting structural support member 26. The support member 26 can be a vertical support member 28 or horizontal member 30. The support member 26 defines an interior channel 52 for housing electrical cabling 54. Extension cables, power cables, etc. can be manually inserted into the interior channel 52 via opening 56 which extends longitudinally the length of the support member 26. For example, where lighting is provided at an upper level 22c, etc., cabling 54 can run along the interior channel 52 of vertical support members 28a and 28b to provide power to a lighting strip 60 positioned at level 22c. This allows for cable management from a floor or wall supply to the upper levels. Similarly, lines can be run from an overhead source downward along the members 26.

The structural support member 26 further includes at least one exterior channel 62 for mounting a linear lighting 60 such as LED strip lighting. The embodiment shown provides a generally cylindrical tubular support member 26, although other shapes are possible, such as supports having a generally flat wall or walls. The embodiment shown provides for multiple rows of lighting by defining two exterior lighting channels 62a and 62b. The channels 62 are sized to accept and hold a longitudinally extending linear lighting sources 60. The channel 62 is designed to allow the linear light source 60 to be slid into, pressed into, or snapped into a fixed position in the interior channel 62. In some embodiments, the linear light sources are friction fit into the channels. In other embodiments, the linear light sources are maintained in position in the channels by flanges 66, which can take the form of longitudinal flanges running substantially the length of the fixture or can be a plurality of shorter flange tabs spaced apart along the channel. Alternately, other attachment mechanisms can be used to attach and maintain the lighting sources in the channel. For example, linear lighting sources are available having adhesive backing, allowing the lighting sources to be adhered to the channel back wall 68. A version of the support member having a flat back wall would be better suited for use with adhesive backed LED lighting strips.

Figure 4:
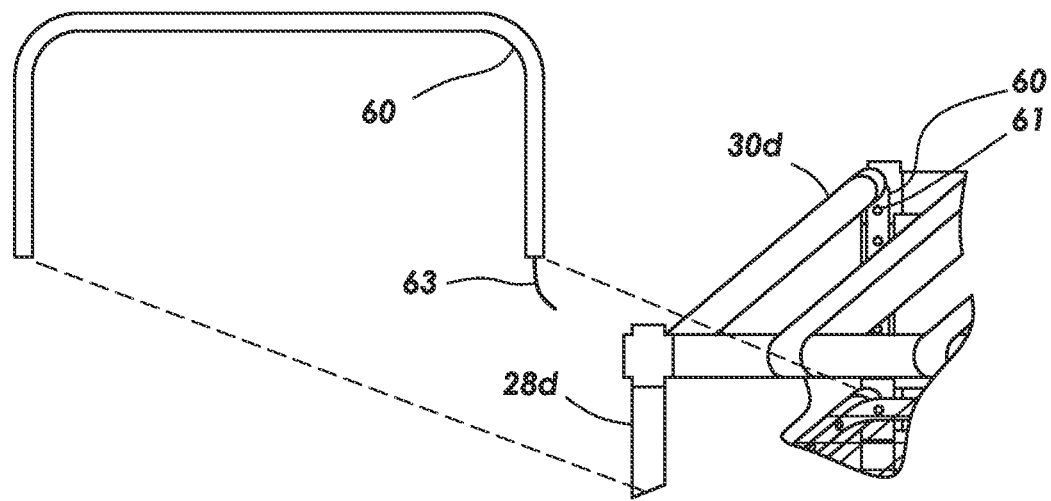
FIG. 4 is a detail view of a modular level having a linear lighting source strung along vertical members and a horizontal member of the level, with an inset detail showing the linear lighting source in side elevation at the level, according to aspects of the disclosure.

The embodiment shown holds and orients two linear lighting sources 60. The linear lighting sources 60 are positioned such that the individual lights along the strips are directed to emit light towards the plants. The exterior channels 62 can direct light in generally the same direction or in disparate directions. For example, if an electrical system support member 26 is used as a horizontal support member 30 above the level of the plant, the exterior channels 62 can be oriented to direct light angled both upwardly and downwardly; that is, emitting light across a wide radial range. If the electrical system support member 26 is used as a vertical support member 28, it may be desirable to have the exterior channels 62 direct light along a narrower radial range, as seen in FIG. 4. Additional exterior channels 62 can be added to increase the intensity or amount of light emitted onto the plants.

The lighting system support member 26 provides at least one outwardly facing, mounting surface 64 for mounting a linear lighting source 60. The mounting surface 64 can be the back wall of a channel 62, as shown. Multiple mounting surfaces 64a and 64b can be provided. The lighting sources 60 can be adhesively mounted to the mounting surfaces 64. In some embodiments, the mounting surfaces are part of a channel 62, generally flat, or have a width to cooperate with the width of a typical linear lighting source. The lighting support member 26 can further define a cable management channel 52. In some embodiments the cable management channel 52 is defined by the interior space of a tubular member, as shown. Alternately, the cable management system can provide a separate dedicated channel whether in an interior space of the member or not. The cable management channel 52 can be accessed via a longitudinally extending opening 56 or slot running the length of the support member 26.

In some embodiments, the connectors 32 are off-the-shelf and/or do not define exterior lighting channels 62. Similarly, such connectors 32 do not provide access to an interior channel 52 along a longitudinal opening 56. Consequently, where two support members 26 are connected at a connector 32, the joint creates a "gap" between adjacent exterior lighting channels 62. For cases where the connected electrical system supports are joined at an angle, such as at a ninety degree angle between a vertical and a horizontal support, for example, the lighting source can be flexible enough to bend from one such support member to another. That is, the linear lighting source 60 can extend from a first exterior channel 62 of a first electrical system support 26, make a bend (in this example, of ninety degrees), and then be positioned in a corresponding first exterior channel 62 of a second support member 26. Similarly, where the linear lighting source 60 extends from a first support member 26 to an aligned second support member 26 (having aligned exterior channels 62), the linear lighting source 60 may be flexible enough to "bend around" the connector 32. That is, the strip 62 would exit the exterior channel 62 of the first member 26, run along the exterior of the connector 32, and then enter the exterior channel 62 of the second member 26. Alternately, the light strips 62 and/or cabling 52 can be strung through an interior channel defined in the connector. Alternately, a first linear lighting source 60 can be connected to a second linear lighting source 60 at the joint, such that the light strip 62 need not bend out of the exterior channels. For example, a first and second light strip 62 can be connected by a cable at the structural joints.

Figure 3:
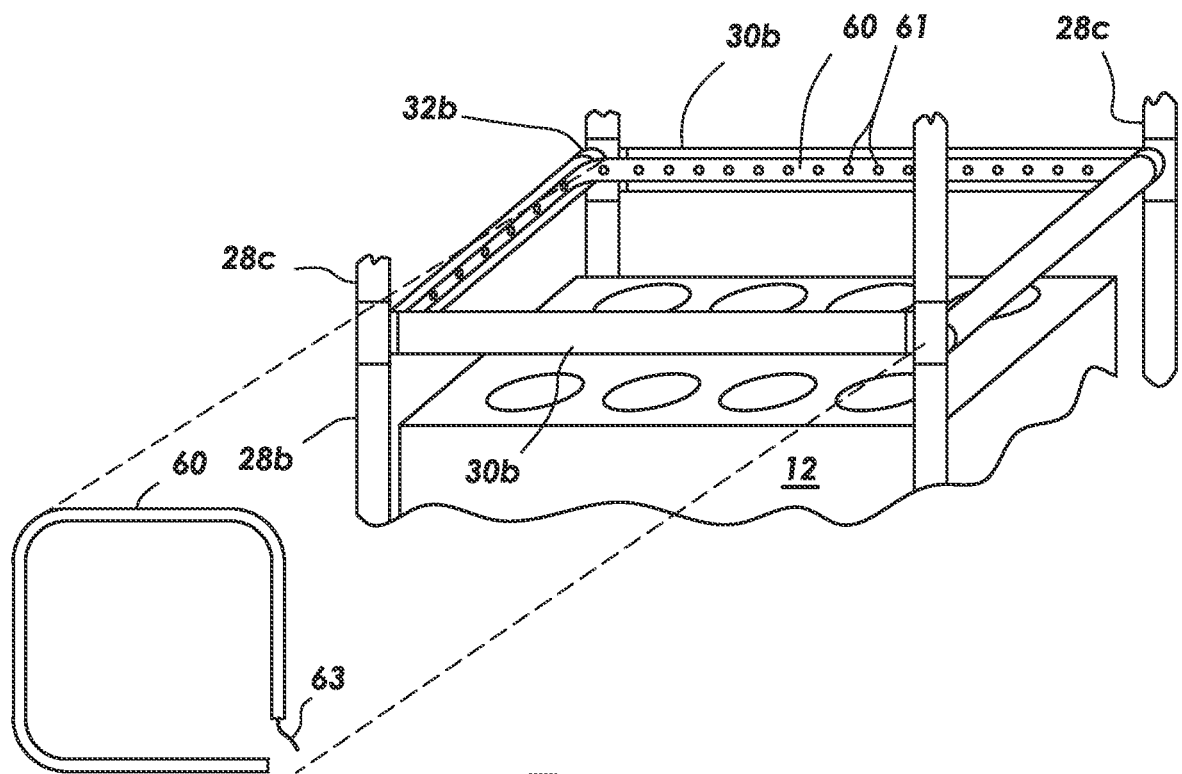
FIG. 3 is a detail view of a selected level having a linear lighting source positioned on the horizontal members, with an inset showing a top schematic view of the linear lighting source, according to aspects of the disclosure.

FIG. 3 is a detail view of a selected level 22b having a linear lighting source 60 positioned on the horizontal members 30b, with an inset showing a top schematic view of the linear lighting source 60. A power cable 63 can be routed from a power source to a vertical support member at ground level. The cable can be inserted into and run along the interior channel of one or more vertical support members 28. As seen in FIG. 3, at a selected horizontal member 30b, the cable 63 can be connected to a linear lighting source 60 (e.g., LED light strip). The linear lighting source 60 can be inserted into an exterior channel 62 of the horizontal support member 30b and positioned to emit light onto the plants adjacent the horizontal member. Where the horizontal member is joined to a second horizontal support member, the linear lighting source 60 can be bent from one member to the next. Such a linear lighting source 60, if of sufficient length, can be wound around the horizontal members 30b of the entire level 22b, passing through exterior channels 62 defined in each of the (four) horizontal members 30b at that level 22b.

FIG. 4 is a detail view of level 22d having a linear lighting source 60 strung along a vertical member 28d, across a horizontal member 30d, and back down an adjoining vertical member 28d, with an inset detail showing the linear lighting source 60 in side elevation. Similarly, a single linear lighting source 60 can be threaded along a vertical support member 28d, and along an intersecting horizontal support member 30d, then back along a second vertical support member 28d of a selected level, here level 22d, as seen in FIG. 4. Other arrangements will be apparent given this description.

For support members with two or more exterior channels 62, a single linear lighting source 60 can be run "up" one channel 62a and then back "down" the other channel 62b. Between, the linear lighting source 60 can be wound along other support members 26.

Figure 5:
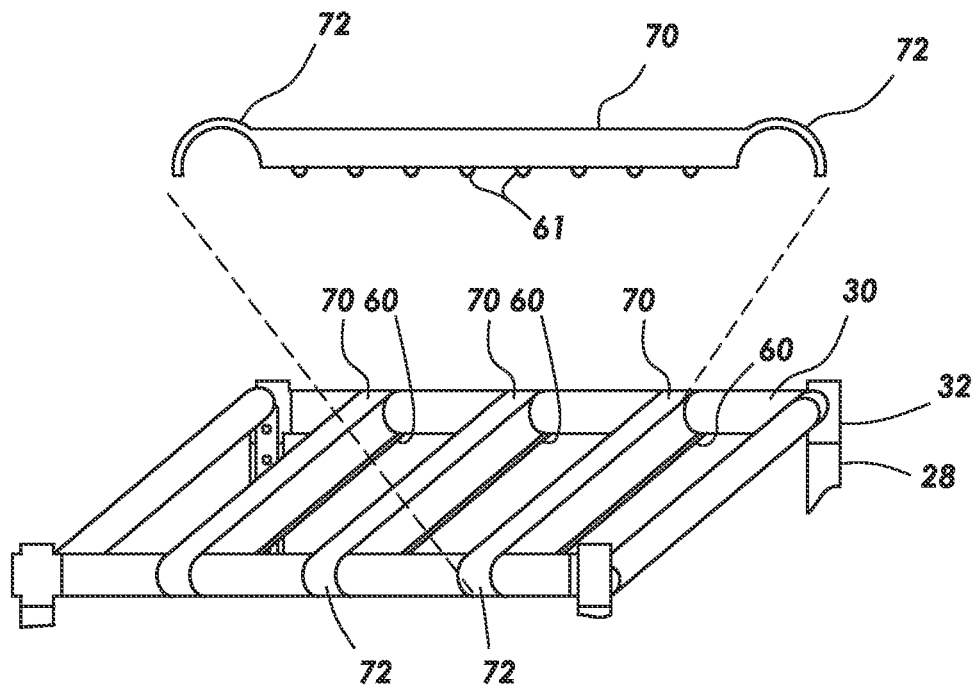
FIG. 5 is a partial view of a lighting and scrog assembly according to aspects of the disclosure showing lighting bar fixtures for use in the assembly, with an inset showing the fixture in side view detail.

FIG. 5 is a partial view of a lighting and scrog assembly according to aspects of the disclosure showing lighting bar fixtures 70 for use in the assembly with an inset showing the fixture 70. The lighting bar fixtures 70 are used as a removable light fixture, preferably utilizing exterior lighting channels 62 as described above. A lighting bar fixture 70 can attach to spaced-apart horizontal support members 30 as shown. The attachment can be at connectors or joints 32, as described above with respect to support members 26. Alternately, a lighting bar fixture can simply lay atop a horizontal member 30, cooperate with a groove in such a member, or otherwise be attached to the member. In one embodiment, the lighting bar fixture 70 has generally U-shaped end pieces 72 which are positioned over a horizontal support member 30 such that the bar 70 is supported by opposed horizontal members. The bar fixture 70 can define interior channels 52 and/or exterior channels 62. Light bar fixtures can be added as desired at any level.

An alternative to a lighting bar fixture design can be the addition of a support, mounting unit, or other attachment for holding a third-party manufacturers' lighting fixtures which could be utilized in conjunction with the lighting sources of the present disclosure. Alternately, overhead lighting can be used in conjunction with the systems described herein.

Figure 6:
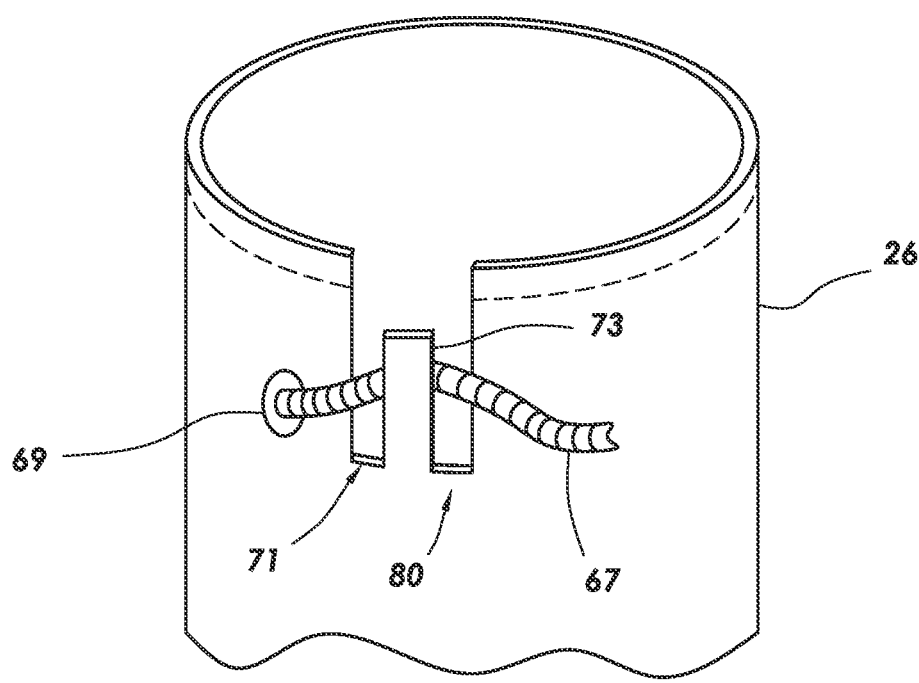
FIG. 6 is an orthogonal view of an end of an exemplary support member according to the disclosure having a connecting structure for a growth accessory.

FIG. 6 is an orthogonal view of an end of an exemplary support member 26 according to the disclosure having a connecting structure 80 for a growth accessory 65. Here, an accessory, such as a scrog netting is attached to a support member 26 via a string, cord or the like 67. The string is attached to an end device 69, such as a washer, loop, hook, etc. The string 67 is run through a double slot assembly 71, with the end device 69 hanging up in the slot, preventing the string from disengaging the double slot assembly. Alternately, a loop at the end of the string can simply be hung over the central tine 73 defined between the double slots. The central tine 73 can be "short," as shown. That is, the end of the tine can be longitudinally spaced from the end of the member 26, such that access to the tine and double slot is available even after a connector 32 is attached to the member 26 (at the dotted line). Other methods of attaching scrog growth supports will be apparent to those of skill in the art.

The linear lighting source 60 can include a plurality of individual lights, such as LED lights along a longitudinal LED lighting strip or module. The linear lighting source can take various forms. LED lighting strips, with or without adhesive backing, can be used. For example, the lighting source can be lighting strips or lighting modules such as are commercially available. Lighting modules have spaced apart, stiff circuit boards, each board typically having one to three light sources, the boards connected by intervening wires. Further, the lighting source can be a single color or color-changing sources which allow for color-changing as well as white. The LED lighting strips preferably have lights specifically designed to provide light for plants and to promote plant growth. For example, LED lights can provide red, blue, white, UV, etc., light at various stages of plant growth, such as at seeding, for vegetative growth, blooming, and overall health of the plant. Since the plants' light needs may change over the plants' life, a color changing LED strip can be used and the emitted light changed over the plant's life. Various spectrum lighting can be supplied, such as one or a mixture of the following: red 630-660 nm, blue at around 460 nm, white 6000-6500 k, UV 380-400 nm, IR 730-740 nm, etc. Lighting strips can be used having various lengths. For example, for a 20 foot fixture length, a 20 foot LED strip can be used. Alternately, shorter lengths can be used and connected end-to-end at strip connectors. Further, LED strip lighting is available for use with a controller which can operate the LED lights on the strip individually. Hence, it is possible to control the lights such that only lights adjacent the plants are on (e.g., the lower lights while the plant is short) to reduce electricity costs. Further, it would be possible to tune each light to a selected frequency (e.g., UV, white, red, etc.) based on the needs of the plant.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The words or terms used herein have their plain, ordinary meaning in the field of this disclosure, except to the extent explicitly and clearly defined in this disclosure or unless the specific context otherwise requires a different meaning. If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. The indefinite articles "a" or "an" mean one or more than one of the component, part, or step that the article introduces. The terms "and," "or," and "and/or" shall be read in the least restrictive sense possible. Each numerical value should be read once as modified by the term "about" (unless already expressly so modified), and then read again as not so modified, unless otherwise indicated in context.

It is claimed:

1. A modular lighting system for providing grow lighting to plants, the system comprising:
   a plurality of levels of structure, each level supported by the level below, each level having a plurality of longitudinally extending vertical members and a plurality of longitudinally extending horizontal members connected to one another at connectors to generally form a vertical column for supporting one or more plants, each plant growing upwards through multiple of the plurality of levels of support structure,
   a plurality of the members each defining a longitudinally extending exterior-facing channel for positioning linear lighting, the exterior-facing channel orienting the linear lighting for emitting light onto the one or more plants,
   at least one of the plurality of the vertical members defining a longitudinally extending channel for positioning one or more electrical cables; and
   a plurality of linear lighting sources for growing plants, each linear lighting source positioned in a longitudinally extending channel of the a horizontal member, wherein at least one of the linear lighting sources is provided with power from a cable extending through one of the connectors.

2. The modular support system of claim 1, further comprising a plurality of connectors positioned between and connecting the plurality of members, cabling extending through at least one of the connectors and providing power to at least one of the linear lighting sources.

3. The modular support system of claim 1, wherein the plurality of levels of members further comprises a base level comprising: a plurality of base vertical members connected to a plurality of base horizontal members, the connected base vertical and base horizontal members generally forming a base column about a plant grow area.

4. The modular support system of claim 1, further comprising scrog netting extending across the vertical column, the scrog netting supported by multiple of the plurality of members.

5. The modular support system of claim 1, further comprising a plurality of lighting fixtures extending horizontally across the column, the plurality of lighting fixtures supported by multiple of the generally horizontal members.

6. The modular support system of claim 5, each of the lighting fixtures having at least one exterior-facing channel defined therein for positioning linear lighting; and at least one linear lighting assembly positioned in the exterior-facing channel of each lighting fixture.

7. The modular support system of claim 1, wherein the linear lighting further comprises LED light strips for grow lighting for plants.

8. The modular support system of claim 1, further comprising an electrical cable extending through an interior channel of a member of one level to an interior channel of a member of another level.

9. The modular support system of claim 1, wherein a first linear lighting source extends from a second member.

10. A plant grow lighting system comprising:
    a plurality of support members including generally vertical members and generally horizontal members connected together at a plurality of connectors and defining a generally vertical column having multiple, vertically spaced apart, horizontal members;
    multiple plants positioned within the column, each plant extending vertically through the column, extending past and adjacent to at least two vertically spaced apart horizontal members;
    each of the multiple, vertically spaced apart horizontal members comprising a tubular having a channel in which is positioned a linear lighting source;
    the linear lighting sources oriented for providing light to plants positioned interior to the column; and
    power cabling for the linear lighting sources running along at least one of the vertical members, wherein at least one of the horizontal linear lighting members is provided with power from a cable extending through one of the connectors.

11. A modular system for supporting and providing grow lighting to plants, the system comprising:
    a plurality of horizontally extending members, the horizontally extending members forming multiple, vertically spaced apart levels, the horizontally extending members supported by connectors positioned on vertically extending members, each horizontally extending support member:
      being generally tubular,
      defining a longitudinal lighting channel extending the length of the horizontally extending member, the longitudinal lighting channel engaging and supporting a linear lighting source; and
      the linear lighting source positioned in the longitudinal lighting channel and oriented to provide light to at least one plant; and
    wherein at least one of the horizontal linear lighting members is provided with power from a cable extending through one of the connectors.

12. The system of claim 11, wherein each horizontally extending member defines a cable channel extending longitudinally along the length of the horizontally extending member.

13. The system of claim 11, further comprising a scrog net attached to at least one of the vertically or horizontally extending members.

14. A system for supporting and providing grow lighting to plants, the system comprising:
- multiple vertical support members extending vertically adjacent one or more plants, the vertical support members having connectors for supporting horizontal linear lighting members;
- multiple removably attachable horizontal linear lighting members, each linear lighting member extending between and removably attached to connectors of two of the vertical supports;
- the multiple horizontal linear lighting members arranged in multiple levels, each level spaced vertically apart from an adjacent level;
- wherein at least one of the horizontal linear lighting members is provided with power from a cable extending through one of the connectors; and
- a plurality of plants positioned adjacent the vertical support members and extending vertically past multiple levels of the horizontal linear lighting members.

15. The system of claim 14, further comprising scrog netting supporting the plurality of plants, the scrog netting supported by the vertical support members or the horizontal linear lighting members.

16. The modular support system of claim 1, wherein the linear lighting sources individually controllable to vary the light emitted by the linear lighting source.

17. The system of claim 11, wherein each linear lighting source individually controllable by a controller to vary the light emitted from the linear lighting source.

* * * * *